(12) United States Patent
Koh et al.

(10) Patent No.: US 10,518,303 B2
(45) Date of Patent: Dec. 31, 2019

(54) THERMAL DESORPTION SYSTEM AND METHOD FOR OIL-CONTAMINATED SOIL AND GRAVEL USING MICROWAVE INDIRECT IRRADIATION

(71) Applicant: Korea Railroad Research Institute, Uiwang (KR)

(72) Inventors: Tae Hoon Koh, Uiwang (KR); Dong Geun Lee, Uiwang (KR); Han Ju Yoo, Uiwang (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 0 days.

(21) Appl. No.: 16/096,289

(22) PCT Filed: Feb. 6, 2018

(86) PCT No.: PCT/KR2018/001538
§ 371 (c)(1),
(2) Date: Oct. 25, 2018

(87) PCT Pub. No.: WO2018/151451
PCT Pub. Date: Aug. 23, 2018

(65) Prior Publication Data
US 2019/0134686 A1    May 9, 2019

(30) Foreign Application Priority Data

Feb. 20, 2017    (KR) .................. 10-2017-0022486

(51) Int. Cl.
*F26B 3/00*    (2006.01)
*F26B 3/34*    (2006.01)
(Continued)

(52) U.S. Cl.
CPC ............... *B09C 1/06* (2013.01); *B02C 23/10* (2013.01); *F26B 3/347* (2013.01)

(58) Field of Classification Search
CPC . B09C 1/06; B02C 23/08; B02C 23/10; F26B 3/347
(Continued)

(56) References Cited

U.S. PATENT DOCUMENTS 5,230,167 A * 7/1993 Lahoda ................. B09B 3/0091
                                                                    34/75
5,710,360 A * 1/1998 Self ............................. A62D 3/40
                                                                    110/346
(Continued)

FOREIGN PATENT DOCUMENTS

JP        2001149915 A  *  6/2001  ............... B09C 1/06
JP        2010-255978 A1    11/2010
(Continued)

OTHER PUBLICATIONS

International Search Report for PCT/KR2018/001538 dated May 14, 2018.

*Primary Examiner* — Benjamin F Fiorello
*Assistant Examiner* — Edwin J Toledo-Duran

(57) ABSTRACT

Disclosed are a thermal desorption system for oil-contaminated soil and gravel, using a microwave indirect irradiation method and including a microwave emission prevention device and a preheating device using waste heat, and a thermal desorption method for oil-contaminated soil and gravel, using the same. In addition, it is disclosed that an outer tube encompassing an inner tube extends to both sides and a plurality of ring-shaped microwave attenuation units are arranged on the inner circumferential surface of the outer tube, such that microwaves are prevented from leaking between the inner tube and the outer tube, thereby enabling eco-friendliness, and even the waste heat generated during a pollutant desorption process is utilized in the system itself, thereby enabling economic feasibility to increase further.

7 Claims, 4 Drawing Sheets

(51) Int. Cl.
*B09C 1/06* (2006.01)
*B02C 23/10* (2006.01)
*F26B 3/347* (2006.01)

(58) Field of Classification Search
USPC ............ 588/209, 213, 228, 900; 204/157.15, 204/158.2, 158.21; 422/199; 110/346; 405/128.1–128.9
See application file for complete search history.

(56) References Cited

U.S. PATENT DOCUMENTS

| | | | | |
|---|---|---|---|---|
| 6,082,548 | A * | 7/2000 | Stephenson | B03B 5/623 |
| | | | | 134/25.1 |
| 6,270,735 | B2 * | 8/2001 | Wagner | B09B 3/00 |
| | | | | 202/117 |
| 9,004,817 | B2 * | 4/2015 | Hanasaka | B09C 1/06 |
| | | | | 405/128.85 |
| 2004/0195182 | A1 * | 10/2004 | Elliott | B01J 20/26 |
| | | | | 210/681 |
| 2005/0189108 | A1 * | 9/2005 | Davidson | B01J 8/16 |
| | | | | 166/249 |
| 2012/0263538 | A1 * | 10/2012 | Hanasaka | H05B 6/107 |
| | | | | 405/128.85 |
| 2013/0105469 | A1 * | 5/2013 | Gregg | F42B 33/067 |
| | | | | 219/647 |
| 2016/0045841 | A1 * | 2/2016 | Kaplan | B01J 19/0093 |
| | | | | 429/49 |
| 2019/0134686 | A1 * | 5/2019 | Koh | B09C 1/06 |

FOREIGN PATENT DOCUMENTS

| | | |
|---|---|---|
| KR | 10-0614612 B1 | 8/2006 |
| KR | 10-1608020 B1 | 3/2016 |
| KR | 10-1619799 B1 | 5/2016 |
| KR | 10-1678593 B1 | 11/2016 |
| KR | 2017-0011309 A1 | 2/2017 |

* cited by examiner

THERMAL DESORPTION SYSTEM AND METHOD FOR OIL-CONTAMINATED SOIL AND GRAVEL USING MICROWAVE INDIRECT IRRADIATION

CROSS REFERENCE TO RELATED APPLICATIONS

This application claims priority to Korean Patent Application No. 10-2017-0022486, filed on Feb. 20, 2017. Further, the application is the National Phase application of International Application No. PCT/KR2018/001538, filed on Feb. 6, 2018, which designates the United States. Each of these applications is hereby incorporated by reference in their entirety into the present application.

TECHNICAL FIELD

Embodiments of the present invention relate to a thermal desorption system for oil-contaminated soil and gravel using a microwave indirect irradiation method including a microwave leakage prevention device and a preheating device using waste heat, and a thermal desorption method for the oil contaminated soil and gravel using the same. More particularly, embodiments of the present invention relate to an apparatus and method for purifying soil and gravel contaminated by contamination sources such as various oil and organic wastes in an economical and environmentally friendly manner by using a microwave indirect irradiation method.

BACKGROUND ART

Recently, as the interest in the global environment and the human living environment has increased and the damage caused by environmental pollution has been recognized, the environmental pollution restoration projects are carried out all over the world and the restoration project market has been growing rapidly.

Restoration of the environment is generally carried out by government regulation and control rather than voluntary, and the introduction of environmental laws and regulations for human health and environmental protection is the driving force for environmental restoration industry.

Recently, as restoration projects for railroad sites have been actively carried out, interest in restoration techniques for not only soil but also ballast has been greatly increased. This is also the result of the concrete regulation of contaminated soil in railroad sites as the Soil Conservation Act is strengthened recently.

The main contaminant sources in the railroad soil are oil spills from the oil storage tanks located on the ground or in the underground, oil spill in the locomotive refueling area, leakages and fugitives of fuels, greases, lubricants, and the like generated from railway vehicles, leachate discharged from waste recycling centers, fugitive oil generated during maintenance of vehicles, and various particulate materials generated during operation. The main contaminant sources in the railroad soil are very diverse and extensive. In order to prevent the contamination of railroad soil, some workplaces have overhauled places of diesel locomotives from which oil leaks out, installed roll pads, FRP or steel plates in railroad vehicle maintenance centers, and paved concrete pavements for railroad vehicle in-out lines. However, this is not an ultimate solution but a temporary measure. Since the railroad workplaces and contamination-inducing facilities are not concentrated but distributed in a wide area and there is a lack of basic data on soil contamination of the railroad sites, it is difficult to grasp the contamination degree and to manage and control the contamination sources. Therefore, it takes a lot of time and money to solve the problem of soil contamination of railroad.

Currently, railroad ballast is used in many sections of domestic and international railway lines, and the railroad ballast is first contaminated because it is laid on the top of the railroad. Particularly, railroad turnouts contaminate the ballast because a considerable amount of lubricant is used. The contaminants on the surface of the ballast move continuously to the bottom of the railroad line due to gravity or rain, and contaminate the roadbed and bottom soil. When the groundwater flowing around the soil is contaminated, the surrounding soil is also contaminated and the contaminated area is gradually enlarged.

Currently, contaminated gravel collected during the replacement work of contaminated railroad ballast is being disposed of in landfills. At this time, most of the collected railroad ballast are designated and buried as designated waste, not general waste, because their surfaces are heavily contaminated. However, since the buried contaminants continue to have adverse effects on the environment over the long term in the form of leachate, landfill gas, odor, etc., it is necessary to separate and treat the contaminants rather than landfill.

As landfill shortage has grown serious gradually, the cost of landfill has been rising steadily. Therefore, there is a growing need for other treatment methods than landfill. In addition, new gravel is needed for the replacement of ballast, and destruction of forests and ecosystems continues to secure new gravel. However, due to the government's strengthened regulations on deforestation and public opinion of environmental groups and the people against the destruction of ecosystems, the supply of new gravel is becoming increasingly difficult. Therefore, there is a growing need for recycling of ballast.

Currently, as technologies to purify contaminated soil and railroad ballast, a thermal treatment method that uses heat to decompose and detoxify contaminants, a microbiological treatment method that activates soil bacteria or promotes the biodegradation of organic compounds by introducing specially developed bacterial strains, soil vaper extraction techniques such as in-situ venting (ISV) or soil vacuum extraction (SVE), which extract polluted air through pores in contaminated soil or gravel, have been developed and utilized. However, these technologies have limitations in expanding their applications because of their low economic feasibility and efficiency.

On the other hand, the proposed patent (Korean Registered Patent No. 10-0614612) discloses a technology that provides an equipment for collecting railroad ballast, an equipment for removing the pollutants on the surface of the railroad ballast by performing blasting on the collected ballast using sand or other media, and an equipment for spraying gravel from which the pollutants are removed on the railroad in the vehicle capable of traveling along the railroad and recycles the railroad ballast by removing the pollutants from the ballast while moving along the railroad. However, although the above method has the merit of being able to purify the railroad ballast on the railroad, it is not easy to use in actual field because it does not have the economic feasibility and efficiency. It does not have high decontamination efficiency because it uses the blasting method.

In order to solve such a problem, the present inventors suggested the technology that separates and purifies contaminants from contaminated soil and ballast by a thermal desorption method using a microwave to secure economic feasibility and to generate heat at a low temperature and a high temperature so that sufficient thermal desorption can be achieved with only one pass regardless of the type of oil through Korean Registered Patent No. 10-1678593. In this patent, the structure of the contaminant desorbing part in which the contaminants are thermally detached is improved so as to include an outer tube and an inner tube. The contaminated ballast passes through the inside of the inner tube and the microwave absorbing and heat generating element is provided on the outer surface of the inner tube so that the contaminants of the surface of the contaminated soil and ballast inside the inner tube are desorbed thermally by irradiating microwave onto the microwave absorbing and heat generating element. A material that is very cheap compared to the price of existing materials and has excellent heat generation efficiency is used as the microwave absorbing and heat generating element, thereby ensuring economic feasibility and purifying the soil contaminated by most oil regardless of the type of oil. However, in this technology, since microwaves are reflected in and leaked out from the space between the outer tube and the inner tube, it may adversely affect the environment. Therefore, it is necessary to improve the above. Also, since the waste heat generated in the contaminants desorption process is released to the outside, there is a need for further improvement in terms of energy efficiency.

DISCLOSURE OF INVENTION

Technical Problems

The present invention has been developed in consideration of the prior art as described above. The present invention provides a technology that can increase economic feasibility and environmental friendliness by preventing microwave from leaking to the outside and utilizing waste heat generated in a contaminant desorption process in the system itself in a method for separating and purifying contaminants from contaminated soil and ballast by a thermal desorption method using a microwave so that the problems of Korean Registered Patent No. 10-1678593 proposed by the present inventors have been overcome.

Technical Solution

In the following, contaminated soil and gravel may refer to contaminated soil and contaminated gravel individually, or may refer to mixed forms thereof, unless otherwise specified. Therefore, it is referred to as contaminated soil and gravel for convenience.

In order to achieve the above object, the present invention may provide an oil-contaminated soil and gravel thermal desorption system using a microwave indirect irradiation method including, a storage part in which contaminated soil and gravel are stored;

a conveying part configured to introduce the contaminated soil and gravel of the storage part into a contaminant desorbing part;

the contaminant desorbing part configured to desorb contaminants from the contaminated soil and gravel conveyed by the conveying part by heat, including an inlet through which the contaminated soil and gravel are introduced, a treatment section in which the contaminated soil and gravel are subjected to thermal desorption treatment, and an outlet through which the soil and gravel subjected to the thermal desorption treatment are discharged, wherein a single or a plurality of microwave oscillating parts are connected to one side of the treatment section, the contaminant desorbing part includes an outer tube that constitutes a cylindrical fixed container and an inner tube that is formed in a cylindrical shape having a smaller diameter than the outer tube and rotatably disposed inside the outer tube by a rotation shaft and into which the contaminated soil and gravel are introduced through the inlet, a driving motor to which the rotation shaft is extended and connected is provided outside of the outer tube, an outer circumferential surface of the inner tube is provided with a microwave absorbing and heat generating element for absorbing microwaves to generate heat, a cavity space for reflecting microwaves is provided between the outer tube and the inner tube, and the microwaves irradiated from the microwave oscillating part generate irregular reflection in the cavity space so that heat is generated in the microwave absorbing and heat generating element provided on the outer circumferential surface of the inner tube, thereby thermally desorbing contaminants from the contaminated soil and gravel inside the inner tube; and a retrieving part configured to retrieve the soil and gravel from which contaminants have been removed through the contaminant desorbing part, wherein the contaminant desorbing part comprises portions extended from opposite ends of the outer tube and a plurality of microwave attenuating members each of which has a hook shape bent twice in a center direction of the contaminant desorbing part along inner circumferential surfaces of the extended portions of the outer tube.

An embodiment of the present invention may include a pretreatment part configured to treat the contaminated soil to form fine particles; and at least one of a crusher configured to crush the contaminated soil fine-granulated in the pretreatment part and a sorter configured to sort the contaminated soil by particle size.

In an embodiment of the present invention, the conveying part may include a drying unit for drying the contaminated soil and gravel.

In an embodiment of the present invention, the contaminant desorbing part may be connected to an emission post-treatment part for transporting and treating gas and dust discharged by desorption of the contaminants and then discharging the treated gas and dust.

In an embodiment of the present invention, a waste heat discharge pipe for discharging waste heat remaining in the emission post-treatment part may be connected to the emission post-treatment part in one direction, and the waste heat discharge pipe may be configured to pass through the storage part.

Also, in order to achieve the above object, the present invention may provide an oil-contaminated soil and gravel thermal desorption method using a microwave indirect irradiation method including, storing contaminated soil and gravel in a storage part and conveying the contaminated soil and gravel to a contaminant desorbing part;

desorbing contaminants from the contaminated soil and gravel by heat while conveying the contaminated soil and gravel in the contaminant desorbing part, wherein the contaminant desorbing part includes an inlet through which the contaminated soil and gravel are introduced, a treatment section in which the contaminated soil and gravel are subjected to thermal desorption treatment, and an outlet through which the soil and gravel subjected to the thermal desorption treatment are discharged, a single or a plurality of microwave oscillating parts are connected to one side of the treatment section, the contaminant desorbing part includes an outer tube that constitutes a cylindrical fixed container and an inner tube that is formed in a cylindrical shape having a smaller diameter than the outer tube and rotatably disposed inside the outer tube by a rotation shaft and into which the contaminated soil and gravel are introduced through the inlet, a driving motor to which the rotation shaft is extended and connected is provided outside of the outer tube, an outer circumferential surface of the inner tube is provided with a microwave absorbing and heat generating element for absorbing microwaves to generate heat, a cavity space for reflecting microwaves is provided between the outer tube and the inner tube, and the microwaves irradiated from the microwave oscillating part generate irregular reflection in the cavity space so that heat is generated in the microwave absorbing and heat generating element provided on the outer circumferential surface of the inner tube, thereby thermally desorbing contaminants from the contaminated soil and gravel inside the inner tube; and retrieving the soil and gravel from which the contaminants have been removed through the contaminant desorbing part, wherein the contaminant desorbing part includes portions extended from opposite ends of the outer tube and a plurality of microwave attenuating members each of which has a hook shape bent twice in a center direction of the contaminant desorbing part along inner circumferential surfaces of the extended portions of the outer tube, thereby preventing the microwaves emitted into the space between the outer tube and the inner tube from leaking to an outside.

In an embodiment of the present invention, the contaminant desorbing part may be connected to an emission post-treatment part for transporting and treating gas and dust discharged by desorption of the contaminants and then discharging the treated gas and dust, wherein a waste heat discharge pipe for discharging waste heat remaining in the emission post-treatment part is connected to the emission post-treatment part in one direction, and wherein the waste heat discharge pipe is configured to pass through the storage part, so that the contaminated soil and gravel is preheated using the waste heat in the storage part.

Advantageous Effects

The features and advantages of the contaminated soil and gravel thermal desorption system using the microwave indirect irradiation method according to the present invention and the contaminated soil and gravel thermal desorption method using the same will be described below.

1. First, since the method of desorbing contaminants by heat is used, it is possible to remove contaminants regardless of contaminant sources, and particularly, it has an excellent effect for removing contaminants related to oil.

2. In addition, since it is not necessary to separately manufacture and install a plate-like or stick-type heating element used in a conventional thermal desorption method using microwaves, the manufacturing cost of equipment is low.

3. Further, since a contaminant desorbing part is composed of an outer tube and an inner tube, an object to be purified (ballast) is introduced into the inner tube configured to rotate inside the outer tube, and a microwave absorbing and heat generating element is provided on the outer circumferential surface of the inner tube so that heat is transmitted to the contaminated ballast by the indirect method so as to thermally desorb the contaminants by irradiating microwaves to the microwave absorbing and heat generating element, the thermal desorption efficiency is higher than that of the conventional method. Therefore, enough contaminants may be removed by only one pass, and productivity is remarkably higher than the conventional method.

4. In addition, since the material used as the microwave absorbing and heat generating element is remarkably inexpensive as compared with the conventional expensive material, the economic feasibility is high. In other words, the silicon carbide (SiC) used in the prior art has a market price of about 6.5 million won/ton and the market price of zirconium (ZrO2) is about 2.2 million won/ton. Therefore, they are very expensive. However, the microwave absorbing and heat generating element according to the present invention does not exceed 200,000 won/ton even if it includes all of the manufacturing costs. Therefore, compared with the conventional technology which is not utilized due to the economic feasibility, the present technology may secure the economic feasibility and the possibility of actual field application is very high.

5. Further, the microwave absorber is not discarded or filtered by using a mesh or the like as in the conventional method, and the microwave absorbing and heat generating element is provided in the inner tube and may be used semi-permanently, so that there is no need for a separate post-process and the process operation cost may be remarkably reduced.

6. In addition, since the outer tube surrounding the inner tube is extended from both ends thereof and the plurality of microwave attenuating members having a hook shape are arranged on the inner circumferential surface of the outer tube, the microwaves may be prevented from leaking out between the inner tube and the outer tube, thereby ensuring environment friendliness. The waste heat generated in the contaminant desorbing process may be utilized in the system itself, thereby further increasing the economic feasibility.

BEST MODE FOR CARRYING OUT THE INVENTION

Hereinafter, preferred embodiments of the present invention will be described in detail with reference to drawings. It should be understood, however, that the detailed description and specific examples, while indicating preferred embodiments of the invention, are given by way of illustration only, and thus are not limitative of the scope of the invention.

Figure 1:
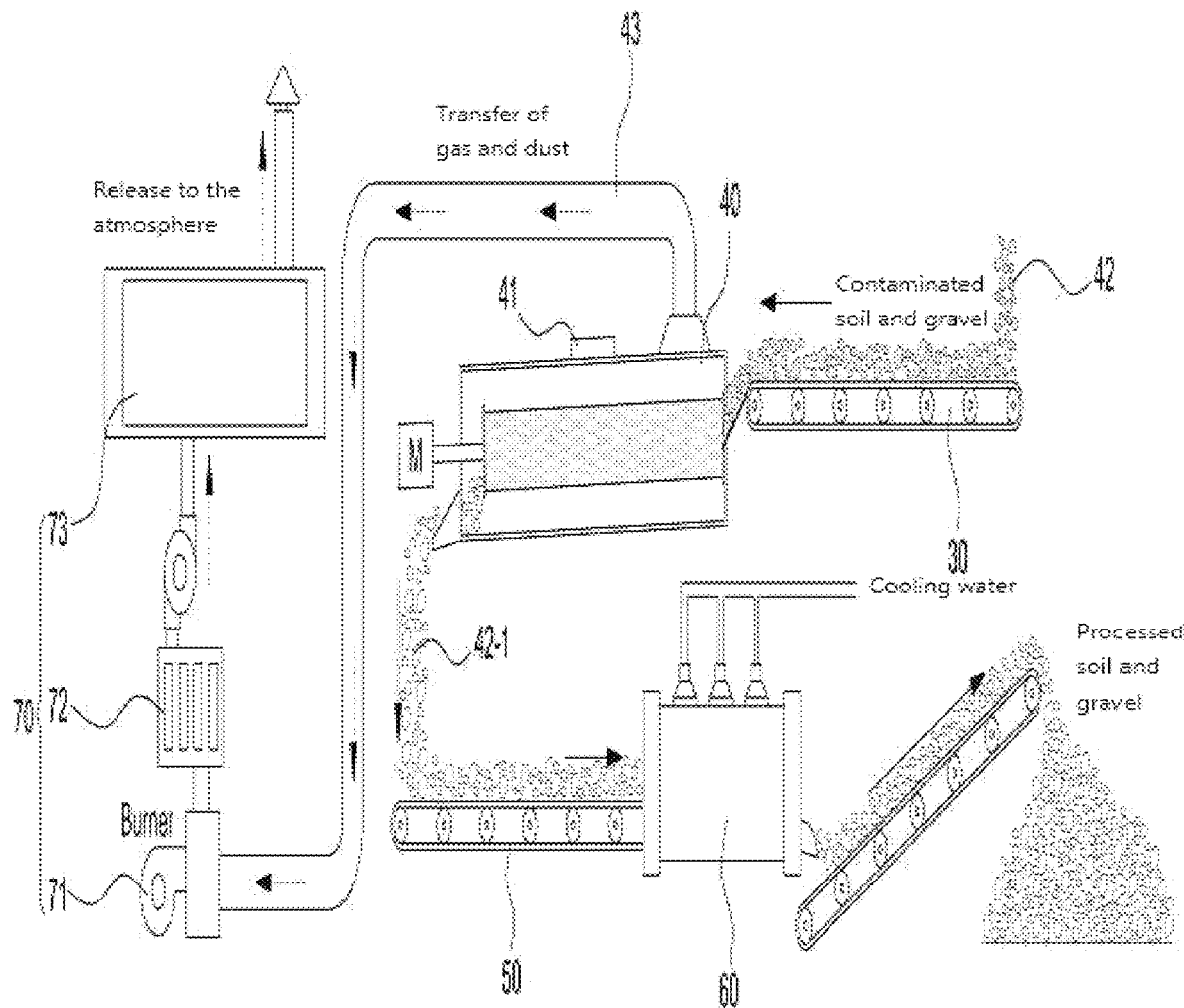
FIG. 1 is a view illustrating the entire process of the contaminated soil and gravel purification process using the contaminated soil and gravel purification system according to the prior Korean Patent No. 10-1678593 of the present inventors.
Figure 2:
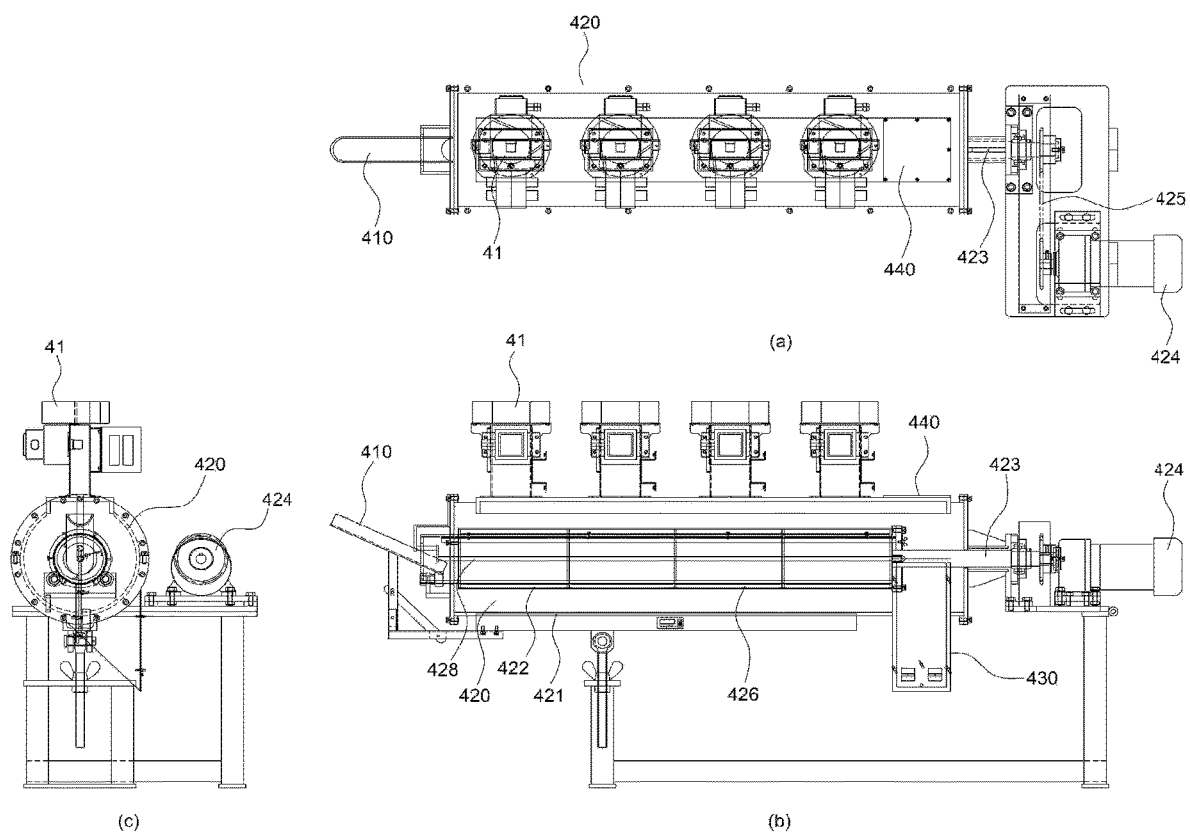
FIG. 2 is a view illustrating a contaminant desorbing part in the contaminated soil and gravel system according to FIG. 1.

FIG. 1 is a view illustrating the entire process of a contaminated soil and gravel purification process using the contaminated soil and gravel purification system according to the prior Korean Patent No. 10-1678593 of the present inventors, and FIG. 2 is a view illustrating a contaminant desorbing part in the contaminated soil and gravel system according to FIG. 1.

As shown in the drawings, the contaminated soil and gravel thermal desorption system using the microwave indirect irradiation method according to the prior Korean Patent No. 10-1678593 of the present inventors includes, a conveying part 30 for conveying contaminated soil and gravel to a contaminant desorbing part;

the contaminant desorbing part 40 for desorbing contaminants from the contaminated soil and gravel conveyed from the conveying part 30 by heat; and a retrieving part 50 for retrieving soil and gravel from which the contaminants have been removed through the contaminant desorbing part. In this configuration, the prior patent is not so different from a thermal desorption system according to the present invention.

Therefore, many of the configurations described in the above-described Korean Patent 10-1678593 may be adopted as they are.

In other words, first, soil and ballast contaminated in a railroad or the like are stored in a storage part such as a hopper, and then conveyed to the contaminant desorbing part 40 through the conveying part 30 such as a screw or a conveyor belt. In addition, the conveying part 30 may further include a drying unit for drying moisture from the contaminated soil and gravel. The drying unit may be a known drying unit such as heating, ventilation, hot air drying, etc. The removal of moisture by the drying unit may increase the efficiency of removing contaminants from the contaminated soil and gravel by heat in the contaminant desorbing part 40.

The contaminant desorbing part 40 has a closed room structure except for the entrance and exit of the contaminated soil and gravel 42 and functions as a resonant room to diffuse microwaves irradiated from a microwave oscillating part 41. The contaminated soil and gravel 42 are transported in a downward direction by their own weight or their own weight and vibration in a state in which a heat treatment section of the contaminant desorbing part 40 is tilted to one side. At this time, one or more, preferably a plurality of, microwave oscillating parts 41 may be provided on one side of an outer tube of the contaminant desorbing part 40, for example, on the upper or side portion thereof. The microwave oscillating part 41 includes a microwave oscillator (magnetron) and a high voltage transformer, and further includes a high voltage condenser, a high voltage diode, and the like. The high voltage transformer transforms a commercial AC voltage input from the outside into a high voltage (for example, about 4 kilovolts [kV]) suitable for generating a high frequency and applies the transformed voltage to the magnetron. The magnetron generates microwaves by high frequency oscillation due to the high voltage applied from the high voltage transformer. The frequency of the microwave is an Industrial, Scientific, and Medical (ISM) frequency, but it is preferable to use the band of 2,450 MHz mainly in consideration of the ease of component supply. However, it is not limited thereto, and microwaves having a frequency in the range of 300 MHz to 300 GHz may be variously used depending on the application. A cooling fan is disposed at one end of the magnetron to cool the high temperature generated in the magnetron when the magnetron is driven. The cooling fan is connected to a fan motor. When a voltage is applied from the outside to the fan motor, the fan motor is operated and the cooling fan is driven by the fan motor to blow the external cold air to the magnetron, so that the high temperature generated in the magnetron may be cooled. However, the cooling fan may be excluded when using other devices for cooling the magnetron or when separate cooling devices are not required, such as when exposed to the outside. In addition, when the microwave oscillating part 41 is required to be spaced apart from the contaminant desorbing part 40, the microwave oscillating part 41 may be connected to that using a waveguide (not illustrated).

Although a few microwave oscillating parts 41 are shown in the drawing, they are provided for convenience of description. In practice, a plurality of microwave oscillating parts 41 may be provided closely around the outer tube along the outer tube.

The contaminant desorbing part 40 may be connected to an emission post-treatment part 70 for transferring and treating gas and dust discharged by the thermal desorption of contaminants and discharging the treated gas and dust. The discharged gas and dust are transferred to a post-burner 71 through a transfer pipe 43 and then post-burned by the burner. Then, the discharged gas and dust may be cooled through a cooler 72, and then discharged through a back filter 73 into the atmosphere. At this time, the contaminants that are undesirable to be released into the atmosphere without being completely burned by the post-burner in the dust state may be collected by a separate dust collection facility. In addition, dust such as noxious gas, whose emissions into the atmosphere are limited, may be filtered by an adsorber configured to force the dust to be sucked in and separate the dust from the air by attaching the dust.

A retrieving part 50 for retrieving soil and gravel (purified soil and gravel) 42-1 from which contaminants have been removed through the contaminant desorbing part 40 is provided.

Since the soil and gravel retrieved in the retrieving part 50 are in a high temperature state, a soil and gravel cooling treatment part 60 for treating and retrieving the soil and gravel with the cooling water may be further included.

In detail, as illustrated in FIG. 2, the contaminant desorbing part may include an inlet 410 through which the contaminated soil and gravel 42 are introduced, a heat treatment section 420 through which the contaminated soil and gravel are subjected to thermal desorption treatment, and an outlet 430 through which the soil and gravel subjected to thermal desorption treatment are discharged. A single or a plurality of microwave oscillating parts 41 are connected to one side of the heat treatment section 420. The contaminant desorbing part includes an outer tube 421 that constitutes a cylindrical fixed container and an inner tube 422 that is formed in a cylindrical shape having a smaller diameter than the outer tube and rotatably disposed inside the outer tube 421 by a rotation shaft 423 and into which the contaminated soil and gravel are introduced through the inlet 410. A driving motor 424 to which the rotation shaft 423 is extended and connected is provided outside of the outer tube 421. The outer circumferential surface of the inner tube 422 is provided with a microwave absorbing and heat generating element 426 for absorbing microwaves to generate heat. A cavity space 427 for reflecting microwaves is provided between the outer tube 421 and the inner tube 422 so that the microwaves irradiated from the microwave oscillating parts 41 generate irregular reflection in the cavity space 427. As a result, heat is generated in the microwave absorbing and heat generating element 426 provided on the outer circumferential surface of the inner tube 422, so that contaminants on the surface of the contaminated soil and gravel 42 inside the inner tube 422 are thermally detached.

In FIG. 2, the driving motor 424 is shown to transmit a driving force to the rotation shaft 423 by a chain 425, but may not necessarily be so. The driving motor 424 may be configured to transmit the driving force in a gear manner. Alternatively, the driving motor 424 may be directly connected to the rotation shaft 423.

Referring to FIG. 2, a single or a plurality of microwave oscillating parts 41 are connected to the one side of the heat treatment section 420. The microwave oscillating parts 41 may be disposed on the upper side, the left or right side, or the lower side. In the present invention, the microwave oscillating parts 41 may be densely arranged along the circumference of the tube, and specifically 200 to 300 microwave oscillating parts 41 may be provided.

In addition, the outer tube 421 forming a cylindrical fixed container and the inner tube 422 that is formed in a cylindrical shape having a smaller diameter than the outer tube and rotatably disposed in the outer tube 421 by the rotation shaft 423 and into which the contaminated soil and gravel are introduced through the inlet 410 are provided. The driving motor 424 to which the rotation shaft 423 is extended and connected is provided outside of the outer tube 421. The outer circumferential surface of the inner tube 422 is provided with the microwave absorbing and heat generating element 426 for absorbing microwaves to generate heat. The cavity space 427 for reflecting microwaves is provided between the outer tube 421 and the inner tube 422. The microwaves irradiated from the microwave oscillating part 41 generate irregular reflection in the cavity space 427, so that the microwave absorbing and heat generating element 426 provided on the outer circumferential surface of the inner tube 422 generate heat, thereby thermally desorbing contaminants from the surface of the contaminated soil and gravel 42 inside the inner tube 422.

The method according to exemplary embodiments of the present invention does not thermally desorb the contaminated soil and gravel in the drum by using the high heat generated in the heat source (torch) but indirectly transmits heat generated in the microwave absorbing and heat generating element to the inside of the inner tube so that the transmitted heat is directly contact the contaminated soil and gravel. Therefore, the heat transmit efficiency is high and the heat source acts uniformly throughout the inner tube, so that the uniform heating can be performed as a whole, thereby achieving uniform desorption. In addition, since a heat insulating material is formed outside of the microwave absorbing and heat generating element and prevents the heat from being lost to the outside, the heat transmit efficiency to the contaminated soil and gravel is further improved, thereby maximizing the thermal desorption efficiency.

Further, in accordance with embodiments of the present invention, a temperature measuring part may be provided at the center of the inner tube 422 to detect the temperature inside the inner tube.

The microwave absorbing and heat generating element is provided on the outer circumferential surface of the inner tube 422 of the contaminant desorbing part. The microwave absorbing and heat generating element may be quenched steelmaking slag particles having a particle size of 5.0 mm or less and a sphericity of 0.5 or more and may be surrounded and fixed by an outer skin (for example, a heat resistant metal mesh) so that the quenched steelmaking slag particles are fixed to the outer circumferential surface of the inner tube.

In addition, the microwave absorbing and heat generating element may be a cured product obtained by mixing a binder with quenched steelmaking slag particles having a particle size of 5.0 mm or less and a sphericity of 0.5 or more and may be coated on and fixed to the outer circumferential surface of the inner tube at a uniform thickness. In the present invention, the binder may be a mixture of cement and water, may be a special adhesive, or may be any other binder generally capable of binding an inorganic material. The microwave absorbing and heat generating element is described in detail in the prior Korean Registered Patent No. 10-1678593 of the present inventors.

Preferably, the outer circumferential surface of the microwave absorbing and heat generating element is surrounded by the heat insulating material so that the heat generated by the microwave absorbing and heat generating element is transmitted intensively toward the inside direction rather than the outside direction. As the heat insulating material, glass wool, gypsum, heat-resistant plastic, heat-resistant ceramic, heat-resistant paper or stone powder may be used.

Since the basic thermal desorption system as described above is not greatly different from that described in the above-mentioned Registered Patent 10-1678593, it may be adopted as it is in exemplary embodiments of the present invention.

However, in the above-described patent, microwaves are leaked through a minute gap between the outer tube and the inner tube, which adversely affects the human bodies of the workers and causes malfunctions of the peripheral devices.

The present invention has been developed to solve such a problem.

The basic constitution of the present invention is not different from that disclosed in Korean Registered Patent 10-1678593. Therefore, the structure of the contaminant desorbing part, which is a different part, and the newly added microwave attenuating members will be mainly described.

Figure 3:
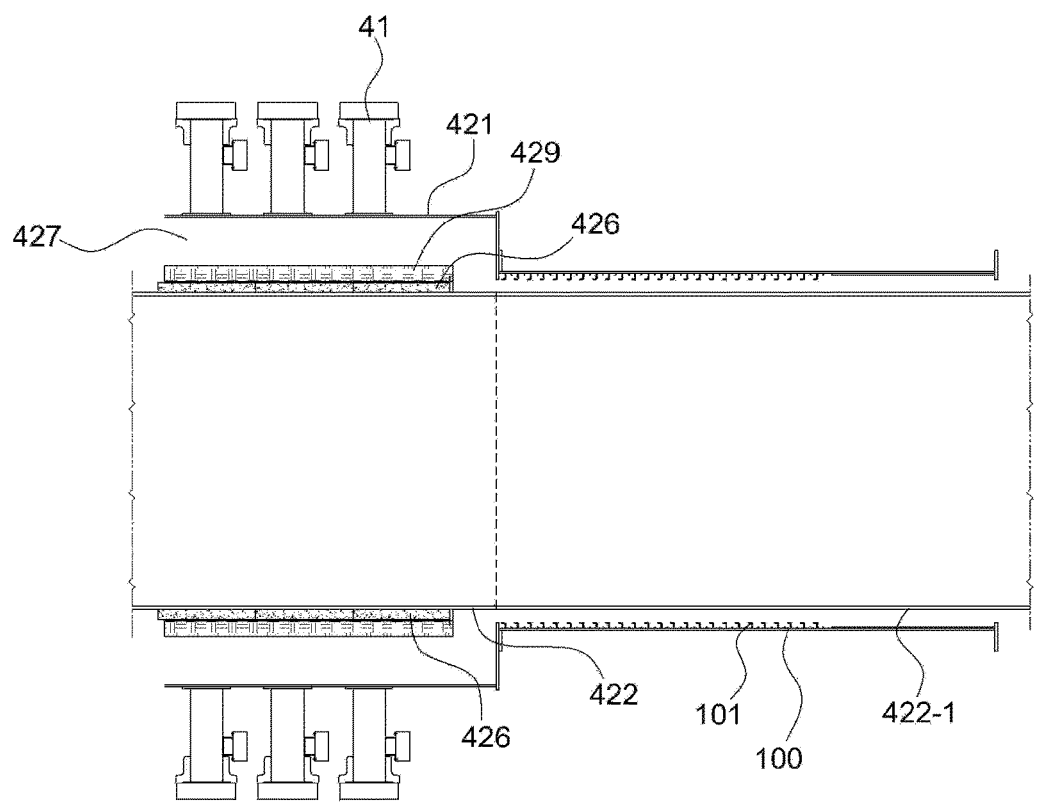
FIG. 3 is a side cross-sectional view enlargedly illustrating microwave attenuating members in a contaminated soil and gravel thermal desorption system according to the present invention.
Figure 4:
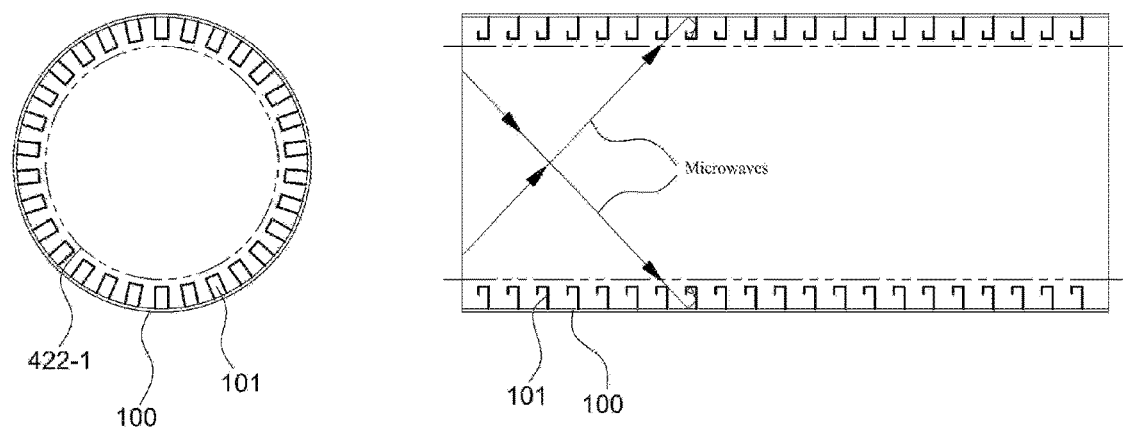
FIG. 4 is a view illustrating microwave attenuating members in a contaminated soil and gravel thermal desorption system according to the present invention.

FIG. 3 is a side cross-sectional view enlargedly illustrating microwave attenuating members in a contaminated soil and gravel thermal desorption system according to exemplary embodiments of the present invention, and FIG. 4 is a view illustrating microwave attenuating members in a contaminated soil and gravel thermal desorption system according to exemplary embodiments of the present invention.

As illustrated in the drawings, exemplary embodiments of the present invention relate to a technology for preventing microwaves from leaking through the minute gap between the outer tube 421 and the inner tube 422 to adversely affect workers health and cause malfunction and damage of peripheral devices.

To this end, in the contaminant desorbing part according to exemplary embodiments of the present invention, an extension tube 100 having a diameter equal to or smaller than that of the outer tube is connected to opposite ends of the outer tube. At this time, as the extension tube is connected to the outer tube, the inner tube 422 also extends to form an inner tube extension section 422-1. This inner tube extension section is provided to facilitate introduction of the contaminated soil conveyed through a screw or the like.

In addition, between the extension tube extended from the outer tube and the inner tube extension section, a plurality of microwave attenuating members 101 having a hook shape bent twice, that is, a holdfast shape are provided on the inner circumferential surface of the extension tube 100 in a regular or irregular manner. As illustrated in the drawing, the microwave attenuating member is configured such that the open portion of the microwave attenuating member is oriented toward the center of the contaminant desorbing part and is bent in the same direction by about 90 degrees twice so that the microwave is extinguished when the microwave is received in the open portion and is not emitted to the outside. Such a microwave attenuating member may be called as a choke in other words, and the microwaves that leak to the outside between the outer tube and the inner tube may be eliminated by almost 100% due to the chokes. The internal structure of the choke may be smaller than the wavelength of the microwave.

The length of the extension tube 100 with the microwave attenuating members and the number of the microwave attenuating members may be variably determined according to the intensity of the microwave, the size of the contaminant desorbing part, and the like.

In addition, exemplary embodiments of the present invention propose a method of recycling waste heat in a contaminated soil and gravel purification system using heat without releasing the waste heat to the outside.

Figure 5:
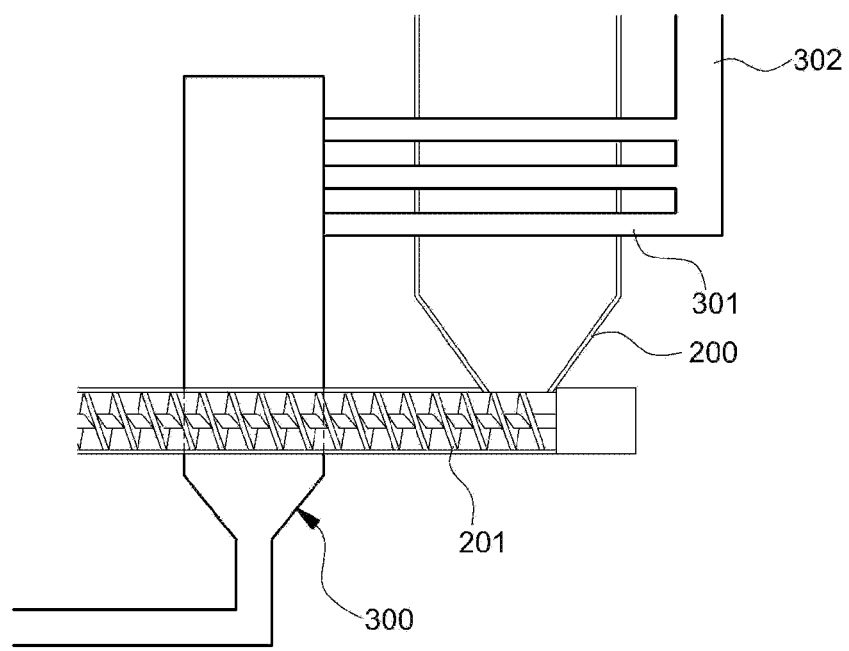
FIG. 5 is a view illustrating a waste heat discharge pipe in a contaminated soil and gravel thermal desorption system according to the present invention.

FIG. 5 is a view illustrating a waste heat discharge pipe part in a contaminated soil and gravel thermal desorption system according to exemplary embodiments of the present invention in a schematic manner.

As illustrated in the drawing, an emission post-treatment part 300 is connected to that. A waste heat discharge pipe 301 for discharging the waste heat remaining in the emission post-treatment part is connected to the emission post-treatment part in one direction. At this time, the waste heat discharge pipe is not directly connected to the dust collecting facility, but is connected to the dust collecting facility through the contaminated soil and gravel storage part 200, that is, the hopper. Thus, the contaminated soil and gravel stored in the storage part 200 may be preheated, thereby reducing the amount of heat consumed in thermal desorption of the contaminated soil and gravel.

Exemplary embodiments of the present invention also relate to a method of purifying contaminated soil and gravel by using the contaminated soil and gravel thermal desorption system using the microwave indirect irradiation method having the above characteristics.

The contaminated soil and gravel purification method according to exemplary embodiments of the present invention may include, (1) storing contaminated soil and gravel in a storage part and conveying the contaminated soil and gravel to a contaminant desorbing part;

(2) desorbing contaminants from the contaminated soil and gravel by heat while conveying the contaminated soil and gravel in the contaminant desorbing part, wherein the contaminant desorbing part includes an inlet through which the contaminated soil and gravel are introduced, a treatment section in which the contaminated soil and gravel are subjected to thermal desorption treatment, and an outlet through which the soil and gravel subjected to the thermal desorption treatment are discharged, a single or a plurality of microwave oscillating parts are connected to one side of the treatment section, the contaminant desorbing part includes an outer tube that constitutes a cylindrical fixed container and an inner tube that is formed in a cylindrical shape having a smaller diameter than the outer tube and rotatably disposed inside the outer tube by a rotation shaft and into which the contaminated soil and gravel are introduced through the inlet, a driving motor to which the rotation shaft is extended and connected is provided outside of the outer tube, the outer circumferential surface of the inner tube is provided with a microwave absorbing and heat generating element for absorbing microwaves to generate heat, a cavity space for reflecting microwaves is provided between the outer tube and the inner, and the microwaves irradiated from the microwave oscillating parts generate irregular reflection in the cavity space so that heat is generated in the microwave absorbing and heat generating element provided on the outer circumferential surface of the inner tube, thereby thermally desorbing contaminants from the contaminated soil and gravel inside the inner tube; and (3) retrieving soil and gravel from which the contaminants have been removed through the contaminant desorbing part.

The contaminant desorbing part includes portions extended from opposite ends of the outer tube and a plurality of microwave attenuating members each of which has a hook shape bent twice in the center direction of the contaminant desorbing part along the inner circumferential surface inside the extended portion of the outer tube, thereby preventing the microwaves emitted into a space between the outer tube and the inner tube from leaking to the outside.

At this time, in the present invention, the contaminant desorbing part is connected to an emission post-treatment part for transporting and treating the gas and dust discharged by the contaminant desorbing part and discharging the treated gas and dust. A waste heat discharge pipe for discharging the waste heat remaining in the emission post-treatment part is connected to the emission post-treatment part in one direction. The waste heat discharge pipe is configured to pass through the storage part so that the contaminated soil and gravel are preheated by using the waste heat in the storage part.

The details of the contaminated soil and gravel purification method according to the present invention are the same as those described above with respect to the contaminated soil and gravel thermal desorption system using the microwave indirect irradiation method according to the present invention, and thus a detailed description thereof is omitted.

The contaminated soil and gravel thermal desorption system using the microwave indirect irradiation method according to the present invention and the contaminated soil and gravel thermal desorption method using the same have been described above. By using the contaminated soil and gravel purification system and method according to the present invention, the purification work may be completed even by treating the contaminated soil and gravel only once, thereby ensuring high productivity. Since the waste material discharged from the steel manufacturing process is used as a raw material of the heating element particles, the object may be achieved even without using the expensive material conventionally used, so that high economic feasibility may be secured and the possibility of actual field application may be remarkably increased. In addition, since the outer tube surrounding the inner tube is extended from both ends and the plurality of microwave attenuating members having a hook shape are arranged on the inner circumferential surface of the outer tube, the microwaves may be prevented from leaking out between the inner tube and the outer tube, thereby ensuring environment friendliness. The waste heat generated in the contaminant desorbing process may be utilized in the system itself, thereby further enhancing the economic feasibility.

While the present invention has been particularly shown and described with reference to the drawings, it is to be understood that the present invention is not limited thereto and that various changes and modifications may be made therein by those skilled in the art. Such variations and

| Description of the reference numerals | |
| --- | --- |
| 30: conveying part | 40: contaminant desorbing part |
| 41: microwave oscillating part | 42: contaminated soil and gravel |
| 42-1: purified soil and gravel | 43: transfer pipe |
| 50: heating element particles | 60; soil and gravel cooling treatment part |
| 70: emission post-treatment part | 71; post-burner |
| 72; cooler | 73: back filter |
| 100: extension tube | 101: microwave attenuating member |
| 200: storage part | 201; conveying part |
| 300: emission post-treatment part | 301: waste heat discharge pipe |
| 302: dust collecting pipe | |
| 410: inlet | 420: heat treatment section |
| 421: outer tube | 422: inner tube |
| 423: rotation shaft | 424: driving motor |
| 425: chain | 426: microwave absorbing and heat generating element |
| 427: cavity space | 428: temperature measuring portion |
| 429: heat insulating material | 430: outlet |
| 440: waste gas and dust outlet | |

The invention claimed is:

1. An oil-contaminated soil and gravel thermal desorption system using a microwave indirect irradiation method comprising:

a storage part in which contaminated soil and gravel are stored;

a conveying part configured to introduce the contaminated soil and gravel of the storage part into a contaminant desorbing part;

the contaminant desorbing part configured to desorb contaminants from the contaminated soil and gravel conveyed by the conveying part by heat, including an inlet through which the contaminated soil and gravel are introduced, a treatment section in which the contaminated soil and gravel are subjected to thermal desorption treatment, and an outlet through which the soil and gravel subjected to the thermal desorption treatment are discharged, wherein a single or a plurality of microwave oscillating parts are connected to one side of the treatment section, the contaminant desorbing part includes an outer tube that constitutes a cylindrical fixed container and an inner tube that is formed in a cylindrical shape having a smaller diameter than the outer tube and rotatably disposed inside the outer tube by a rotation shaft and into which the contaminated soil and gravel are introduced through the inlet, a driving motor to which the rotation shaft is extended and connected is provided outside of the outer tube, an outer circumferential surface of the inner tube is provided with a microwave absorbing and heat generating element for absorbing microwaves to generate heat, a cavity space for reflecting microwaves is provided between the outer tube and the inner tube, and the microwaves irradiated from the single or the plurality of microwave oscillating parts generate irregular reflection in the cavity space so that heat is generated in the microwave absorbing and heat generating element provided on the outer circumferential surface of the inner tube, thereby thermally desorbing contaminants from the contaminated soil and gravel inside the inner tube; and a retrieving part configured to retrieve soil and gravel from which the contaminants have been removed through the contaminant desorbing part, wherein the contaminant desorbing part comprises portions extended from opposite ends of the outer tube and a plurality of microwave attenuating members each of which has a hook shape bent twice in a center direction of the contaminant desorbing part along inner circumferential surfaces of the extended portions of the outer tube.

2. The oil-contaminated soil and gravel thermal desorption system using a microwave indirect irradiation method of claim 1, further comprising:

a pretreatment part configured to treat the contaminated soil to form fine particles; and at least one of a crusher configured to crush the contaminated soil fine-granulated in the pretreatment part and a sorter configured to sort the contaminated soil by particle size.

3. The oil-contaminated soil and gravel thermal desorption system using a microwave indirect irradiation method of claim 1, wherein the conveying part further comprises a drying unit for drying the contaminated soil and gravel.

4. The oil-contaminated soil and gravel thermal desorption system using a microwave indirect irradiation method of claim 1, wherein the contaminant desorbing part is connected to an emission post-treatment part for transporting and treating gas and dust discharged by desorption of the contaminants and then discharging the treated gas and dust.

5. The oil-contaminated soil and gravel thermal desorption system using a microwave indirect irradiation method of claim 4, wherein a waste heat discharge pipe for discharging waste heat remaining in the emission post-treatment part is connected to the emission post-treatment part in one direction, and wherein the waste heat discharge pipe is configured to pass through the storage part.

6. An oil-contaminated soil and gravel thermal desorption method using a microwave indirect irradiation method comprising:

(1) storing contaminated soil and gravel in a storage part and conveying the contaminated soil and gravel to a contaminant desorbing part;

(2) desorbing contaminants from the contaminated soil and gravel by heat while conveying the contaminated soil and gravel in the contaminant desorbing part, wherein the contaminant desorbing part includes an inlet through which the contaminated soil and gravel are introduced, a treatment section in which the contaminated soil and gravel are subjected to thermal desorption treatment, and an outlet through which soil and gravel subjected to the thermal desorption treatment are discharged, a single or a plurality of microwave oscillating parts are connected to one side of the treatment section, the contaminant desorbing part includes an outer tube that constitutes a cylindrical fixed container and an inner tube that is formed in a cylindrical shape having a smaller diameter than the outer tube and rotatably disposed inside the outer tube by a rotation shaft and into which the contaminated soil and gravel are introduced through the inlet, a driving motor to which the rotation shaft is extended and connected is provided outside of the outer tube, an outer circumferential surface of the inner tube is provided with a microwave absorbing and heat generating element for absorbing microwaves to generate heat, a cavity space for reflecting microwaves is provided between the outer tube and the inner tube, and the microwaves irradiated from the single or the plurality of microwave oscillating parts generate irregular reflection in the cavity space so that heat is generated in the microwave absorbing and heat generating element provided on the outer circumferential surface of the inner tube, thereby thermally desorbing contaminants from the contaminated soil and gravel inside the inner tube; and (3) retrieving the soil and gravel from which the contaminants have been removed through the contaminant desorbing part, wherein the contaminant desorbing part includes portions extended from opposite ends of the outer tube and a plurality of microwave attenuating members each of which has a hook shape bent twice in a center direction of the contaminant desorbing part along inner circumferential surfaces of the extended portions of the outer tube, thereby preventing the microwaves emitted into the space between the outer tube and the inner tube from leaking to an outside.

7. The oil-contaminated soil and gravel thermal desorption method using a microwave indirect irradiation method of claim 6, wherein the contaminant desorbing part is connected to an emission post-treatment part for transporting and treating gas and dust discharged by desorption of the contaminants and then discharging the treated gas and dust, wherein a waste heat discharge pipe for discharging waste heat remaining in the emission post-treatment part is connected to the emission post-treatment part in one direction, and wherein the waste heat discharge pipe is configured to pass through the storage part, so that the contaminated soil and gravel is preheated using the waste heat in the storage part.

* * * * *